Dec. 13, 1927.

A. CHESSIN 1,652,558

STEREOSCOPIC PROJECTION

Filed Sept. 16, 1921

INVENTOR

Alexander Chessin

Patented Dec. 13, 1927.

1,652,558

UNITED STATES PATENT OFFICE.

ALEXANDER CHESSIN, OF NEW YORK, N. Y.

STEREOSCOPIC PROJECTION.

Application filed September 16, 1921. Serial No. 501,081.

My invention relates to a method of producing phonographic films for moving picture projecting apparatus which give a stereoscopic effect on the screen.

I am aware that numerous efforts have been made to realize stereoscopic effects on a projection screen, but, to my knowledge, all such efforts have been directed to the production of physical effects similar to that produced in the stereoscope. My invention is of an entirely different nature and is based on a process of mental physiology. It is generally accepted that the stereoscopic conception of an object seen by the human eye is not due to an actual stereoscopic image, but to a mental process whereby the distinct and slightly different impressions received on the retina of each eye, are coordinated in our mind with the actual knowledge of the three-dimensional character of the object seen. In my invention, the pictures projected on a screen are calculated to effect a similar co-ordination in the mind of the observer, as will be made clear from the following description of my process..

Figure 1:
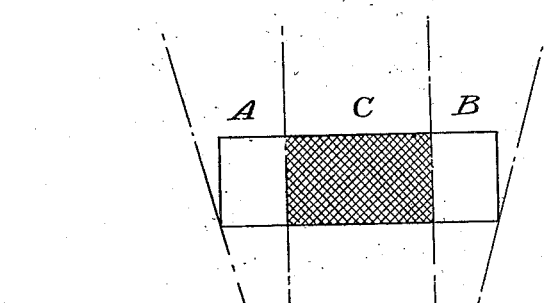
Figure 3:
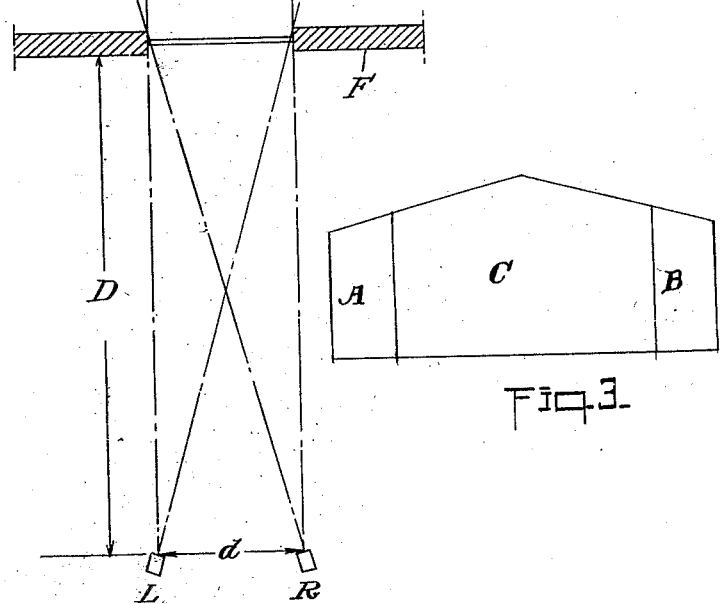
Figure 2:
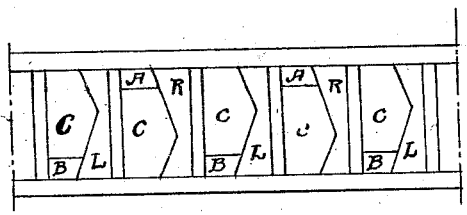

Referring to the accompanying drawings:

Figure 1 is a diagrammatic view of the general arrangement of my invention. Figure 2 is a portion of the film in the form in which it is used in the projection apparatus. Figure 3 is a front view of the object to be reproduced.

In Figure 1, L and R indicate two cameras, referred to, respectively, as the left and right camera, set apart at a predetermined distance $d$. At a fixed distance $D$ from these two cameras, a frame, or a wall with an opening, F, is interposed between the cameras, and the object ACB which is to be photographed. Looking from the camera L, through the frame F, only the portion CB of the object is visible. Looking from the camera R, only the portion AC. Likewise, in photographing the object ACB, the pictures obtained in the two cameras L and R will reproduce different portions of the object, viz., the camera L will reproduce the portion CB, and the camera R, the portion AC, both pictures lying within the reproduction of the frame F. The pictures reproduced in the camera L will be denoted as the left pictures, and those reproduced in the camera R, as the right pictures. If a pair of human eyes were in the place of the two cameras, the distance $d$ would be the distance between the centers of the eyes, and the left and right pictures, each impressed on the retina of the corresponding eye, would, together, convey to the mind of the observer a stereoscopic image of the object ACB.

To obtain the photographs which, projected on a screen, will produce the desired stereoscopic effect, I take simultaneously a series of pictures of the object ACB, through the opening F, with both cameras L and R, at a definite rate $n$ per second. I then produce a new, compound series of pictures by arranging in a row, or band, the two series of pictures obtained by the two cameras, the succession of pictures in this compound series being, intermittently, a left and a right picture, in the order in which these appear in the original series produced by the cameras, in such a manner, that the vertical boundaries, or outlines, of the frame F form two continuous and parallel lines. This band, with the compound row of pictures, may be a film as used in the standard moving pictures apparatus, and when introduced into the projecting camera, must be moved at a rate of $2n$ per second, in order that the impression produced on the retina of the two eyes of an observer by a left picture remain effective during the next time interval, while a right picture is being impressed upon the retina.

Instead of taking the left and right pictures of the object by two separate cameras, I may take them by a single camera wherein the sensitive photographic element is made to slide back and forth, from right to left, for a distance $d$. This would eliminate the necessity of cutting up the two films obtained by the use of separate cameras for the purpose of arranging the succession of right and left pictures in the compound film, as above described, the shifting of the sensitive element in the single camera enabling me to obtain the compound series directly in the desired final form. Of course, the rate of taking the pictures in this manner, by a single camera, should be $2n$, if $n$ was the rate in the two camera method.

I do not limit myself, however, to the specific arrangement described above. I may, for instance, allow blank intervals between two consecutive right and left pictures, or blank intervals between two successive right pictures, followed by a left picture, or any other combination of similar character in accordance with the conditions which have to be met in each case. Obviously, my frame F, also, may be replaced by other means for the bounding of the pictures, for instance, the object may be photographed between two parallel lines, and the reproduction of these parallel lines on the film will, as in the case of the frame F, be made to preserve unbroken lines. Likewise, the speed ratios of the photographing and projection cameras may be varied. Other modifications of my invention will be apparent to those skilled in the art, without departing from the spirit and essence of my invention.

Having described my invention, I claim:

1. As an article of manufacture, a photographic film, composed of a series of pictures taken alternately from two points at a predetermined distance from one another, and through a space bounded by two vertical lines, the photographic reproduction of said vertical lines on said film forming two continuous parallel lines.

2. The herein described method of making a film for projection purposes, consisting in taking a series of photographs of an object through a space bounded by two vertical lines, from two points separated by a predetermined distance, and putting said photographs together in such a manner that an element of one series is followed by an element of the other series, and that the said vertical lines, reproduced in the photographs, form continuous parallel lines.

3. As an article of manufacture, a photographic film, composed of a series of pictures taken from two points at a fixed distance from one another, and through a space bounded by two mutually perpendicular sets of parallel lines, said pictures following one another in a predetermined order, and one of said two sets of parallel lines, as reproduced in said pictures, forming continuous and parallel lines.

4. The herein described method of making a film for projection purposes, consisting in the taking of a series of photographs of an object through a space bounded by two mutually perpendicular sets of parallel lines, from two points separated by a predetermined distance, and putting said photographs together in such a manner that elements of said series of photographs follow one another in a predetermined order, and one of said two sets of parallel lines, as reproduced in said pictures, form continuous and parallel lines.

5. The herein described method of making a film for projecting purposes, consisting in taking a series of photographs of an object through a space bounded by two vertical lines from two points separated by a predetermined distance, each element of said series, taken from one of said points, being followed by an element taken from the other one of said points, the elements of said series following one another in the succession of the time intervals during which said elements were obtained, and the photographic reproductions of said vertical lines on said film forming continuous parallel lines.

6. As an article of manufacture, a photographic film composed of a series of pictures taken alternately from two points at a predetermined distance from one another through a space bounded by two parallel lines, the elements of said series following one another in the order of the successive time intervals at which said elements were taken, and the photographic reproductions of said parallel lines on said film forming continuous parallel lines.

7. The herein described method of making a film for projecting purposes, consisting in taking a series of photographs of an object from two points separated by a predetermined distance, each element of said series, taken from one of said two points, being followed by an element taken from the other one of said two points and being separated therefrom by a blank interval of selective length.

8. As an article of manufacture, a photographic film composed of a series of pictures taken alternately from two points at a predetermined distance from one another and separated by blank intervals of selective lengths.

9. The herein described method of making a film for projecting purposes, which consists in taking a series of photographs of an object through a space bounded by two parallel lines, from two points separated by a predetermined distance, each element of said series, taken from one of said points, being followed by an element taken from the other one of said points and being separated therefrom by a blank interval of selective length, and the photographic reproductions of said parallel lines on said film forming continuations of the same parallel lines.

10. As an article of manufacture, a photographic film composed of a series of pictures taken alternately from two points at a predetermined distance from one another, through a space bounded by two parallel lines, and separated by blank intervals of selective lengths, said parallel lines appearing on said film as continuations of the same parallel lines.

ALEXANDER CHESSIN.